United States Patent
Chichilnisky

(12) 
(10) Patent No.: US 11,983,724 B1
(45) Date of Patent: May 14, 2024

(54) ARTIFICIAL NEURAL NETWORK-ASSISTED CARBON REMOVAL AND SEQUESTRATION ONBOARDING AND CERTIFICATION SYSTEM AND METHOD

(71) Applicant: Graciela Chichilnisky, New York, NY (US)

(72) Inventor: Graciela Chichilnisky, New York, NY (US)

( * ) Notice: Subject to any disclaimer, the term of this patent is extended or adjusted under 35 U.S.C. 154(b) by 0 days.

(21) Appl. No.: 18/460,077

(22) Filed: Sep. 1, 2023

Related U.S. Application Data

(63) Continuation-in-part of application No. 18/298,493, filed on Apr. 11, 2023, now abandoned.

(60) Provisional application No. 63/519,716, filed on Aug. 15, 2023, provisional application No. 63/510,792, filed on Jun. 28, 2023.

(51) Int. Cl.
  *G06Q 30/018* (2023.01)
  *G06N 3/0455* (2023.01)

(52) U.S. Cl.
  CPC ......... *G06Q 30/018* (2013.01); *G06N 3/0455* (2023.01)

(58) Field of Classification Search
  None
  See application file for complete search history.

(56) References Cited

U.S. PATENT DOCUMENTS 9,528,192 B1    12/2016  Chen
10,214,448 B2    2/2019  Heidel et al.
2021/0248523 A1*  8/2021 Wick ................. G06N 20/00
2022/0156754 A1   5/2022 MacArthur et al.
2023/0274287 A1*  8/2023 Blaikie, III .......... H04L 9/3239
                                                            705/50

FOREIGN PATENT DOCUMENTS

WO   WO-2019068178 A1 *  4/2019 ......... G01N 33/0004

OTHER PUBLICATIONS

Al Shargabi et al. "Carbon Dioxide Applications for Enhanced Oil Recovery Assisted by Nanoparticles: Recent Developments." ACS Omega, Mar. 2022, vol. 7, pp. 9984-9994.
Chichilnisky. "Carbon Removal Market." Mar. 1, 2022, (19 pages).
(Continued)

Primary Examiner — Jan P Mincarelli
(74) Attorney, Agent, or Firm — Leason Ellis LLP

(57) ABSTRACT

Membership services are provided to each of a plurality of users of a plurality of user computing devices, including via software that configures the plurality of user computing devices to operate within the membership services. An encrypted data payload including information representing at least one of carbon removal and/or carbon sequestering is received by a configured user computing device, and the information is validated. As a function of machine learning and artificial intelligence, at least one of carbon removal and/or carbon sequestering associated with validated information is determined. A respective mandate is accessed and, as a function of the validated information and the respective mandate, a determination is made whether the respective user is compliant with the respective mandate. At least one operating feature of the configured user computing device is disabled or enabled, as a function of the user's compliance.

20 Claims, 10 Drawing Sheets

(56) References Cited

OTHER PUBLICATIONS

No Author. "Direct Air Capture." iea. last updated Jul. 11, 2023, (5 pages).
Singh. "Introduction to Artificial Neural Networks." Data Science Blogathon. Sep. 6, 2021, (11 pages).
No Author. "Soil Carbon Sequestration" Institution for Carbon Removal Law and Policy. 2 pages. (2020).
Miranda et al. "Trends on CO2 Capture with Microalgae: A Bibliometric Analysis" Molecules, Jul. 2022, 27, 4669 (14 pages).
No Author. "Enhanced Weathering (Technology Briefing)." http://www.geoengineeringmonitor.org/2021/04/enhanced-weathering.pdf. Apr. 15, 2021, (1 page).
Xu et al. "Challenges and opportunities for engineering thermochemistry in carbon-neutralization technologies." National Science Review. Oct. 14, 2022, (3 pages).
Hahn et al. "Opportunity cost based analysis of corporate eco-efficiency: A methodology and its application to the CO2-efficiency of German companies." Journal of Environmental Managerment. vol. 91. Issue 10. Oct. 2010. pp. 1997-2007.
No Author. "Blue Planet produces coarse and fine aggregates containing sequestered CO2, transforming the global build environment into a carbon sink." Blue Planet Permanent Carbon Capture (2023), (5 pages).
No Author. "Our Paradigm-shifting geomimetic mineralization technology uses CO2 from any source as a feedstock to create carbon-negative aggregate." Blue Planet Permanent Carbon Capture (2023), (2 pages).
No Author. "What is biochar and how is it made?" Golisano Institute for Sustainability. Jan. 20, 2021 (8 pages).
Spears. "What is Biochar?" Regeneration International. May 16, 2018, (6 pages).
Julie Wurth, "Climate win-win: Study quantifies benefits of enhanced weathering", Phys Org, Aug. 21, 2023, pp. 1-5.
National Academies of Sciences, Engineering, and Medicine. Gaseous carbon waste streams utilization: Status and research needs. national Academies press, Feb. 2019 (257 pages).

* cited by examiner

ARTIFICIAL NEURAL NETWORK-ASSISTED CARBON REMOVAL AND SEQUESTRATION ONBOARDING AND CERTIFICATION SYSTEM AND METHOD

CROSS-REFERENCE TO RELATED APPLICATIONS

This application incorporates by reference U.S. patent application Ser. No. 18/298,493, filed on Apr. 11, 2023, and is based on and claims priority to U.S. Provisional Patent Application Ser. No. 63/510,792 filed on Jun. 28, 2023, and is based on and claims priority to U.S. Provisional Patent Application Ser. No. 63/519,716 filed on Aug. 15, 2023, the contents of all of which are incorporated by reference in their respective entireties, as if set forth expressly herein.

FIELD

The present disclosure relates, generally, to legacy carbon management and, more particularly, to a system and method providing membership services including interactive, computer-management of prevention, removal and storage of carbon emissions and legacy carbon from the earth's atmosphere.

BACKGROUND

Parties have entered into agreements regarding amounts of carbon dioxide ("$CO_2$") emissions produced annually, per party. A division of the total amount of $CO_2$ allowed per each of a number (N) participating parties is defined via such agreements. For example, each participating party is allotted a respective measurable amount of $CO_2$ it is allocated to produce, with parties that historically produce larger amounts of $CO_2$ having limits on their emissions that are larger than parties that historically emit less or no $CO_2$.

In operation of such agreements that are associated with limiting $CO_2$ emissions, parties commit to payment of capital to one or more other parties in the event, in any given year, a party exceeds its maximum allotted $CO_2$ emissions. In one or more arrangements, such parties commit to payment to other parties whose emissions contributions are lower than respectively allowed amounts. In this way, a combined level of $CO_2$ emissions of two or more parties can remain the same, year after year, while parties that emit less carbon into the atmosphere are compensated by those that emit more. Effectively, therefore, a price of $CO_2$ in a carbon market is established as a function of the agreements, which can provide effective incentive to reduce $CO_2$ emissions. While such known agreements can be effective to reduce carbon emissions occurring over time, the amount of carbon presently existing in the atmosphere at a given point time, referred to herein generally as "legacy carbon" or "legacy $CO_2$" is not impacted. Unfortunately, $CO_2$ degrades slowly and distributes uniformly in the earth's atmosphere. Accordingly, while agreements covering current $CO_2$ emissions can be effective to reduce the amount of carbon emitted into the earth's atmosphere, the amount of legacy carbon in the atmosphere still increases.

In addition to urgent environmental concerns regarding $CO_2$, the current water crisis shines a stark spotlight on 2 billion people in the world with limited or no access to drinkable water. Climate change, including as a function of carbon buildup and shortages of water, is an existential risk, which can define the geological scope of human civilization and the future of oxygen-driven forms of life on planet Earth. As in the past, the poorer nations of the world bear consequences, because drinking water can be produced for those who can pay to desalinate the ocean's water.

It is with respect to these and other considerations that the disclosure made herein is presented.

BRIEF SUMMARY

Accordingly, the present disclosure includes systems and methods that include at least one data processing apparatus operatively coupled to one or more non-transitory processor readable media. In one or more example implementations of the present disclosure, the non-transitory processor readable media have instructions for configuring the at least one data processing apparatus to perform one or more steps, including providing membership services to each of a plurality of users of a plurality of user computing devices. Further, the at least one data processing apparatus can be configured to provide, to each of the plurality of user computing devices, software having instructions that, when executed, configure the plurality of user computing devices to operate within the membership services. The at least one data processing apparatus can be further configured to receive, from a configured user computing device of a respective user, an encrypted data payload including information representing at least one of carbon removal and/or carbon sequestering. Further, the at least one data processing apparatus can be configured to validate, the information received in the encrypted data payload. Moreover, Further, the at least one data processing apparatus can be configured to determine, as a function of machine learning and artificial intelligence, at least one of carbon removal and/or carbon sequestering associated with validated information in the encrypted data payload. Further, the at least one data processing apparatus can be configured to access a respective mandate associated with the configured user computing device associated with at least one of carbon removal and carbon sequestering. Still further, the at least one data processing apparatus can be configured to determine, as a function of the validated information and the respective mandate, whether the respective user is compliant with the respective mandate. Where the respective user is not compliant with the respective mandate, the at least one data processing apparatus can be configured to automatically disable at least one operating feature of the configured user computing device. Where the respective user is compliant with the respective mandate, the at least one data processing apparatus can be configured to automatically maintain the at least one operating feature of the configured computing device.

In one or more implementations of the present disclosure, the encrypted data payload includes information representing the respective user's production and/or consumption of green goods, wherein the green goods include goods whose production decreases legacy carbon, and further wherein determining whether the respective user is compliant with the respective mandate is further in accordance with the information representing the respective user's production and/or consumption of the green goods.

In one or more implementations of the present disclosure, the encrypted data payload includes information representing the respective user's production and/or consumption of non-green goods, wherein the non-green goods include goods whose production does not decrease legacy carbon, and further wherein determining whether the respective user is compliant with the respective mandate is further in accordance with the information representing the respective user's production and/or consumption of the non-green goods.

In one or more implementations of the present disclosure, the non-transitory processor readable media have instructions for configuring the at least one data processing apparatus to determine whether the respective user is compliant with the respective mandate by determining a net carbon effect.

In one or more implementations of the present disclosure, the encrypted data payload includes information representing at least one of: desalination; bottling; $CO_2$ fuels; microalgae; concrete building materials; soil carbon sequestration; biochcar; and enhanced oil recovery.

In one or more implementations of the present disclosure, the at least one data processing apparatus includes an artificial neural network.

In one or more implementations of the present disclosure, the at least one artificial neural network includes at least one of a convolutional neural network, a recurrent neural network, and an auto encoder neural network.

In one or more implementations of the present disclosure, the at least one artificial neural network operates to assign respective weights to at least some of the information in the encoded data payload, wherein the weights impact the determination of whether the respective user is in compliance with the respective mandate.

Details of one or more implementations of the present disclosure are set forth in the accompanying drawings, description, and claims herein.

BRIEF DESCRIPTION OF THE DRAWINGS

Aspects of the present disclosure will be more readily appreciated upon review of the detailed description of its various embodiments, described below, when taken in conjunction with the accompanying drawings, of which.

DETAILED DESCRIPTION

Figure 1:
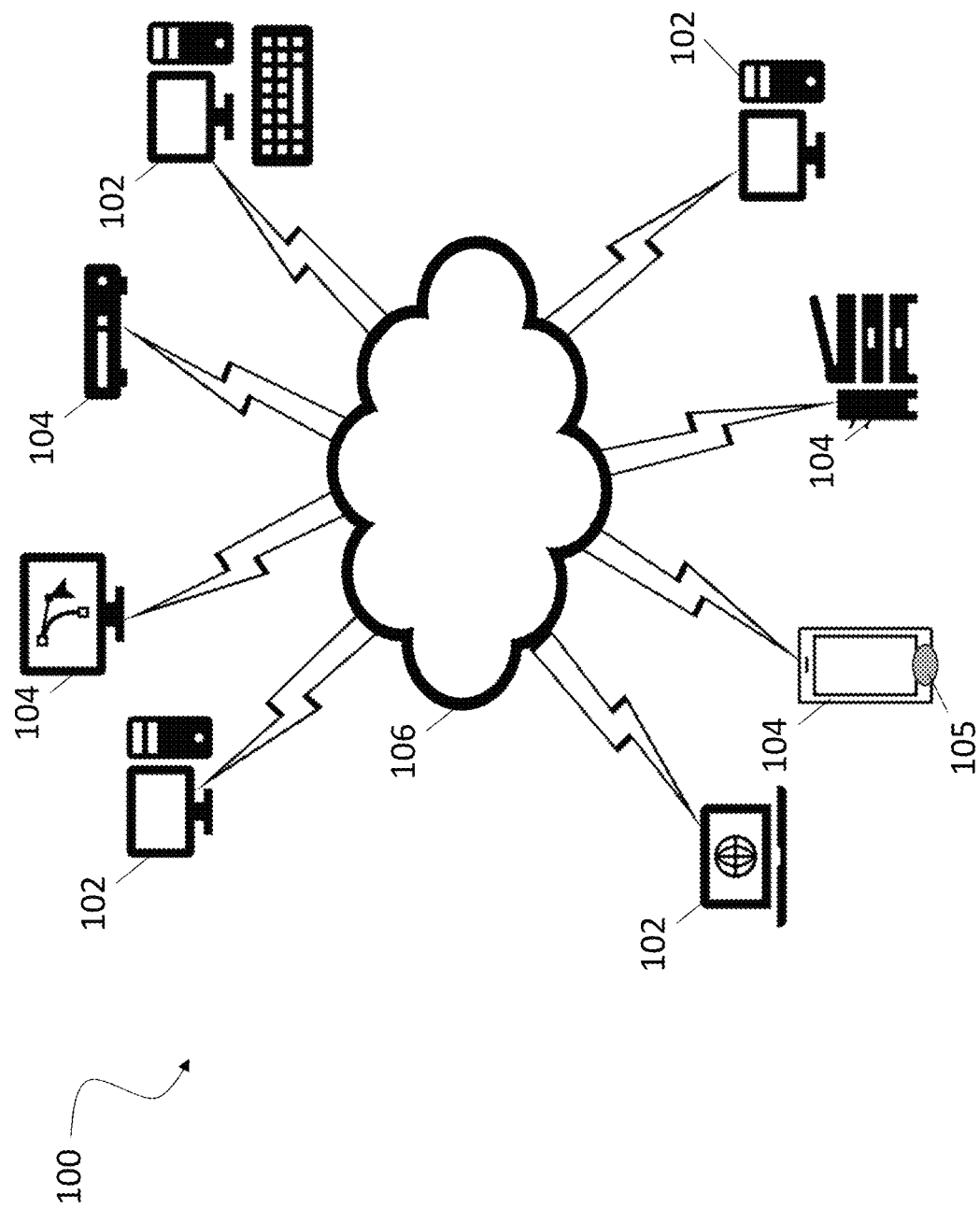
FIG. 1 is a diagram illustrating an example hardware arrangement that operates for providing the systems and methods disclosed herein.

By way of overview and introduction, the present disclosure provides systems and methods for facilitating, managing, and providing operations associated with reducing carbon from the earth's atmosphere. In addition, systems and methods are disclosed for facilitating, managing, and providing goods and/or services associated with carbon. Such operations can include capturing and sequestering the stock of accumulated $CO_2$ in the earth's atmosphere, hereinafter referred to as "legacy carbon," as well as capturing and sequestering $CO_2$ emissions and precluding such emissions from reaching the earth's atmosphere. Still further, such operations can include storing carbon extracted from $CO_2$ in one or more stable materials.

Further, removal and sequestration of carbon can be represented as a function of the amount of removed carbon, as well as one or more offsets, such as a degree of emissions incurred as a result of a particular carbon removal and storage application. More particularly, one particular carbon removal and storage application may require significantly more energy, costs, and resources than another, notwithstanding a benefit relating to such application. Tons of $CO_2$ may get released into the atmosphere during production or operations of a carbon removal and storage application, effectively offsetting the environmental benefits that can be attributed to the removed and stored carbon. In addition, the costs and amount of energy required to capture and store $CO_2$ (including $CO_2$ emissions caused thereby) may not translate directly to a reduction in $CO_2$.

As used herein, the terms sequester, sequestering, sequestration, sequestered, or the like, refer, generally, to storage or stored carbon and/or $CO_2$, regardless of the source of the $CO_2$ or the method by which the $CO_2$ is previously captured (e.g., legacy carbon removal or captured carbon emissions). It is recognized herein that removal of $CO_2$ is generally a temporary phenomenon and that storage of $CO_2$, generally, has a finite duration of different lengths. $CO_2$ can be removed from air and stored, for example, in vegetation or in water, as well as in various other materials such as polymers, carbon fiber, or stones, such as diamonds. For example, trees and other vegetation can store $CO_2$ effectively for some time, but after the tree (or other vegetation) dies the $CO_2$ reverts as a gas and escapes in the atmosphere. Depending on a respective application, carbon may remain stored for a significant period of time, potentially thousands of years. Accordingly, storage of $CO_2$ in materials capable of a longer storage term may be preferred.

In one or more implementations, the present disclosure includes computerized technologies that configure devices associated with each of a plurality of members to measure, control, and monitor of removal, capturing, and sequestering $CO_2$ in one or more stable materials. Technologies can be employed in accordance with the present disclosure for managing information and associated members in connection with extracting $CO_2$ and storing the $CO_2$ in stable materials. Further, the present disclosure includes technologies for determining amounts of $CO_2$ extracted and stored, times of extraction and storage, and other relevant information associated with removed and stored legacy carbon.

In view of the tons of legacy carbon in the earth's atmosphere and amounts of carbon that can be removed and stored in accordance with carbon removal and storage technology, the amount of legacy carbon can increase or decrease over time. Absence of such removal processes, for example, can lead to the amount of legacy carbon increasing. Thus, the net changes in legacy carbon in the atmosphere over time, e.g., from one period of time to another, can be either positive or negative. This is in contradistinction to known techniques for reduction of $CO_2$ emissions, since emissions measurement is always positive.

The present disclosure includes systems and methods that include technology for monitoring, measuring, and accounting for $CO_2$ removal and storage associated with each of a plurality of parties. In one or more implementations, membership services can be provided for in connection with a group of parties (referred to herein, generally as "member parties"). At least some of the member parties agree to reducing and/or storing carbon (including legacy carbon), such as by storing $CO_2$ in one or more stable materials. In operation, member parties adhere to one or more agreements, which bind them to terms of membership. Terms can include mandates for respective allocated amounts of legacy carbon the member parties agree to remove and/or store in stable materials. Other terms and mandates can include quantities of goods and/or services the member parties agree to purchase and/or use over a given period of time. In certain instances, one member party removes and stores legacy carbon in stable materials. Alternatively, or in addition, one member party can remove legacy carbon from the earth's atmosphere and another member party stores the removed legacy carbon in one or more stable materials. In such instances, mandates can be in place, which govern respective amounts and times for carbon removal and storage, as well as other commitments to operations to be carried out by the respective member parties.

Specialized data management operations are provided herein, in accordance with carbon removal and storage operations respectively associated with member parties. For example, member party A commits to a measurable amount of legacy carbon that member party A will remove from the atmosphere and store (or have stored) in one or more stable materials over a period of time, such as during one year. Other member parties B, C, and D commit to different amounts over the same or similar period of time. Alternatively (or in addition), one or more member parties may commit not to the removal and storage of legacy carbon, but rather to reduce $CO_2$ emissions beyond a prescribed amount. As the member parties operate during the course of the year, for example, information representing each of the member parties' legacy carbon activities is transmitted, accessed, and processed by one or more computing devices. For example, greenhouse gas emissions can be calculated based on a party's business operations, such as by establishing a baseline and, thereafter, measuring carbon emissions by the party over the course of the year. Other environmental, social, and governance ("ESG") factors can be measured, such as to determine waste, energy usage, and water desalination and usage, which collectively can also contribute to addition or removal legacy carbon, both directly and indirectly, over time.

The present disclosure can include one or more computing devices that are configured by executing instructions to process information associated with each of a plurality of member parties to determine whether, over the course of a predefined amount of time, a member party increases legacy carbon by an amount that more that the member party is otherwise allowed or prescribed. Alternatively (or in addition), one or more computing devices can be configured to determine, including as a function of data processing and management operations, whether a member party is in compliance with its commitments, such as by decreasing legacy carbon (e.g., via removal and storage of legacy carbon) in accordance with a mandate or by not increasing legacy carbon over an amount in accordance with a mandate.

In such instances where a determination is made by one or more computing devices configured in accordance with the present disclosure that a member party is operating outside of its respective legacy carbon commitment or mandate, calculations can be automatically made representing amounts that the member party must pay. In operation, amounts received from one or more member parties that are not compliant with legacy carbon mandates (e.g., legacy carbon removal/storage or legacy carbon production) can be allocated automatically, by computing devices configured in accordance with the present disclosure, to one or more other member parties that are compliant with respective legacy carbon mandates. For example, a non-compliant member party that is not removing and storing mandated amounts of legacy carbon can pay indirectly (or, in some implementations, directly) amounts to one or more other member parties that are compliant. Measurements can be in absolute terms, such as based on allocated amounts over previous years or other benchmarks, such that by the end of a predefined time period (e.g., one year), the mandated amounts of legacy carbon for two member parties (e.g., one in compliance and one not in compliance) will be the same.

The present disclosure further supports collection, processing, and generation of information associated with particular types of goods produced by respective member parties. For example, the present disclosure includes processing information representing "green goods," which can include goods whose production decreases legacy carbon. Examples of green goods can include in stable materials, such as polymers, cement, stones (e.g., diamonds) and water, and respective goods that include or embody such materials, and include goods/materials that capture $CO_2$, such as stones. In addition, green goods can include one or more goods that are produced with one or more materials comprising sequestered carbon. Information representing amounts of legacy carbon removed from the atmosphere and/or stored in such stable materials can be determined and/or processed by one or more computing devices configured in accordance with the present disclosure, and used to contribute to determining member parties' compliance with respective mandates. Further, such determinations can be used to assess amounts of money or other value that a respective member party may owe or is entitled to receive as a function of that party's respective carbon mandate compliance.

In addition to member parties involved in the production of green goods, which can result in reductions of legacy carbon, the present disclosure supports data processing and management operations associated with goods in which production thereof increases the amount of legacy carbon (hereinafter "regular" goods). The present disclosure can support monitoring and managing information associated with a "green economy," in which the amount of legacy carbon removed and extracted via production of green goods exceeds the amount of legacy carbon increased by the production of regular goods. Accordingly, the present disclosure further supports processing and managing information associated with traditional or regular economies, in which more economic production can lead to increased carbon emissions and increased legacy carbon. Also, information associated with traditional economies can be processed in connection with information associated with green economies, in which economic production can lead, instead, to decreased emissions, as well as to lowering legacy carbon as a function of storage of legacy carbon.

Referring to FIG. 1 a diagram is provided of an example hardware arrangement that operates for providing the systems and methods disclosed herein, and designated generally as system 100. System 100 can include one or more data processing apparatus 102 that are at least communicatively coupled to one or more user computing devices 104 across communication network 106. As used herein, reference to data processing apparatus 102 is meant to include one or more of a plurality of data processing apparatus 102. Data processing apparatus 102 and user computing devices 104 can include, for example, mobile computing devices such as tablet computing devices, smartphones, personal digital assistants or the like, as well as laptop computers and/or desktop computers. Further, one computing device may be configured as a data processing apparatus 102 and a user computing device 104, depending upon operations be executed at a particular time. In addition, an audio/visual capture device 105 is depicted in FIG. 1, which can be configured with one or more cameras (e.g., front-facing and rear-facing cameras), a microphone, a microprocessor, and a communications module(s) and that is coupled to data processing apparatus 102. The audio/visual capture device 105 can be configured to interface with one or more data processing apparatus 102 for producing high-quality audio/video content.

With continued reference to FIG. 1, data processing apparatus 102 can be configured to access one or more databases for the present disclosure, including information associated with member parties, mandates, agreements, and other information associated with a legacy carbon membership. In addition, data processing apparatus 102 can be configured to access Internet websites and other online content, such as associated with $CO_2$ capture and storage technology. It is contemplated that data processing apparatus 102 can access any required databases via communication network 106 or any other communication network to which data processing apparatus 102 has access. Data processing apparatus 102 can communicate with devices including those that comprise databases, using any known communication method, including Ethernet, direct serial, parallel, universal serial bus ("USB") interface, and/or via a local or wide area network.

User computing devices 104 communicate with data processing apparatus 102 using data connections 108, which are respectively coupled to communication network 106. Communication network 106 can be any communication network, but is typically the Internet or some other global computer network. Data connections 108 can be any known arrangement for accessing communication network 106, such as the public internet, private Internet (e.g., VPN), dedicated Internet connection, or dial-up serial line interface protocol/point-to-point protocol (SLIPP/PPP), integrated services digital network (ISDN), dedicated leased-line service, broadband (cable) access, frame relay, digital subscriber line (DSL), asynchronous transfer mode (ATM) or other access techniques.

User computing devices 104 preferably have the ability to send and receive data across communication network 106, and are equipped with web browsers, software applications, or other software and/or hardware tools. By way of example, user computing device 104 may be personal computers such as Intel Pentium-class and Intel Core-class computers or Apple Macintosh computers, tablets, smartphones, but are not limited to such computers. Other computing devices which can communicate over a global computer network such as palmtop computers, personal digital assistants (PDAs) and mass-marketed Internet access devices such as WebTV can be used. In addition, the hardware arrangement of the present invention is not limited to devices that are physically wired to communication network 106, and that wireless communication can be provided between wireless devices and data processing apparatus 102. In one or more implementations, the present disclosure provides improved processing techniques to prevent packet loss, to improve handling interruptions in communications, and other issues associated with wireless technology.

According to an embodiment of the present disclosure, user computing device 104 provides user access to data processing apparatus 102 for the purpose of receiving and providing information. Examples and descriptions of specific functionality provided by system 100 and, in particular, data processing apparatus 102, is described in detail below.

System 100 preferably includes software that provides functionality described in greater detail herein, and preferably resides on one or more data processing apparatus 102 and/or user computing devices 104. One of the functions performed by data processing apparatus 102 is that of operating as a web server and/or a web site host. Data processing apparatus 102 typically communicate with communication network 106 across a permanent i.e., un-switched data connection 108. Permanent connectivity ensures that access to data processing apparatus 102 is always available.

Figure 2:
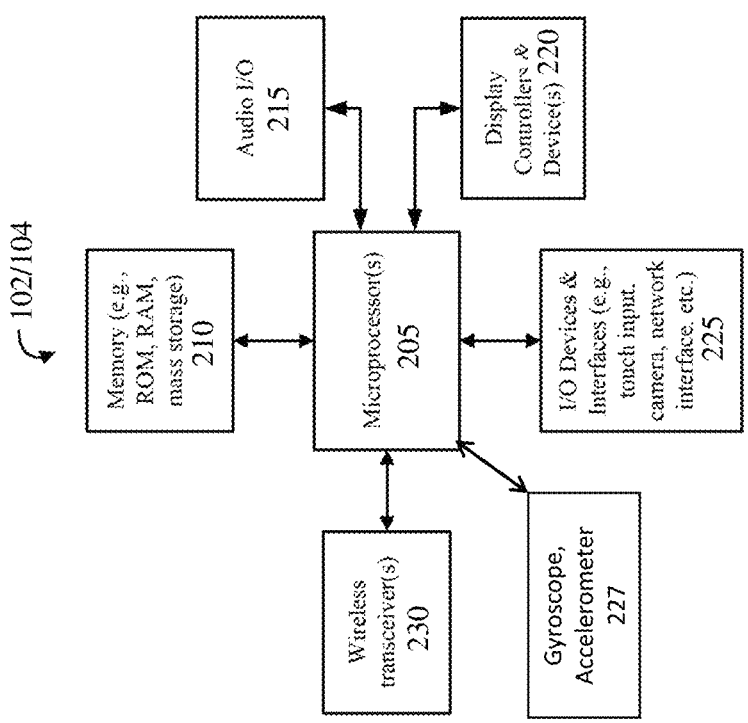
FIG. 2 is a block diagram that illustrates functional elements of a computing device in accordance with an implementation of the present disclosure.

FIG. 2 illustrates, in block diagram form, an exemplary data processing apparatus 102 and/or user computing device 104 that can provide functionality in accordance with the teachings herein. Although not expressly indicated, one or more features shown and described with reference to FIG. 2 can be included with or in the audio/visual capture device 105, as well. Data processing apparatus 102 and/or user computing device 104 may include one or more microprocessors 205 and connected system components (e.g., multiple connected chips) or the data processing apparatus 102 and/or user computing device 104 may be a system on a chip.

The data processing apparatus 102 and/or user computing device 104 includes memory 210 which is coupled to the microprocessor(s) 205. The memory 210 may be used for storing data, metadata, and programs for execution by the microprocessor(s) 205. The memory 210 may include one or more of volatile and non-volatile memories, such as Random Access Memory ("RAM"), Read Only Memory ("ROM"), Flash, Phase Change Memory ("PCM"), or other type of memory. Accordingly, data processing apparatus 102 and/or user computing device 104 can be configured with non-transitory processor readable media, such as described herein.

The data processing apparatus 102 and/or user computing device 104 also includes an audio input/output subsystem 215 which may include a microphone and/or a speaker for, for example, playing back video, providing telephone or voice/video chat functionality through the speaker and microphone, etc.

A display controller and display device 220 provides a visual user interface for the user; this user interface may include a graphical user interface which, for example, is similar to that shown on a Macintosh computer when running Mac OS operating system software or an iPad, iPhone, or similar device when running mobile computing device operating system software.

The data processing apparatus 102 and/or user computing device 104 also includes one or more wireless transceivers 230, such as an IEEE 802.11 transceiver, an infrared transceiver, a Bluetooth transceiver, a wireless cellular telephony transceiver (e.g., 1G, 2G, 3G, 4G, 5G), or another wireless protocol to connect the data processing system 100 with another device, external component, or a network. In addition, gyroscope/accelerometer 235 can be provided.

It will be appreciated that one or more buses, may be used to interconnect the various modules in the block diagram shown in FIG. 2.

The data processing apparatus 102 and/or user computing device 104 may be a personal computer, tablet-style device, such as an iPad, a personal digital assistant (PDA), a cellular telephone with PDA-like functionality, such as an iPhone, a Wi-Fi based telephone, a handheld computer which includes a cellular telephone, a media player, such as an iPod, an entertainment system, such as a iPod touch, or devices which combine aspects or functions of these devices, such as a media player combined with a PDA and a cellular telephone in one device. In other embodiments, the data processing apparatus 102 and/or user computing device 104 may be a network computer or an embedded processing apparatus within another device or consumer electronic product.

The data processing apparatus 102 and/or user computing device 104 also includes one or more input or output ("I/O") devices and interfaces 225 which are provided to allow a user to provide input to, receive output from, and otherwise transfer data to and from the system. These I/O devices may include a mouse, keypad or a keyboard, a touch panel or a multi-touch input panel, camera, network interface, modem, other known I/O devices or a combination of such I/O devices. The touch input panel may be a single touch input panel which is activated with a stylus or a finger or a multi-touch input panel which is activated by one finger or a stylus or multiple fingers, and the panel is capable of distinguishing between 102 or three or more touches and is capable of providing inputs derived from those touches to the data processing apparatus 102 and/or user computing device 104. The I/O devices and interfaces 225 may include a connector for a dock or a connector for a USB interface, FireWire, etc. to connect the system 100 with another device, external component, or a network.

Moreover, the I/O devices and interfaces can include gyroscope and/or accelerometer 227, which can be configured to detect 3-axis angular acceleration around the X, Y and Z axes. Moreover, various other sensor components can be configured with data processing apparatus 102 and/or user computing device 104, as suitably useful in accordance with the teachings herein.

It will be appreciated that additional components, not shown, may also be part of the data processing apparatus 102 and/or user computing device 104, and, in certain embodiments, fewer components than that shown in FIG. 2 may also be used in data processing apparatus 102 and/or user computing device 104. It will be apparent from this description that aspects of the inventions may be embodied, at least in part, in software. That is, the computer-implemented methods may be carried out in a computer system or other data processing system in response to its processor or processing system executing sequences of instructions contained in a memory, such as memory 210 or other machine-readable storage medium. The software may further be transmitted or received over a network (not shown) via a network interface device 225. In various embodiments, hardwired circuitry may be used in combination with the software instructions to implement the present embodiments. Thus, the techniques are not limited to any specific combination of hardware circuitry and software, or to any particular source for the instructions executed by the data processing apparatus 102 and/or user computing device 104.

In one or more implementations of the present disclosure, data processing apparatus 102 can implement one or more artificial neural networks for executing processes shown and described herein. For example, a convolutional neural network can include layers that examine and investigate information received from a respective member party (or a prospective member party) in order to recognize and/or determine the nature of the information that is included in a data payload. Machine learning, including supervised and unsupervised learning techniques, can be implemented to enhance and improve the ability, speed, and accuracy of recognition. In addition to or in place of a convolutional neural network, one or more recurrent neural networks can be implemented to provide feedback information and improved learning. Still further, one or more auto encoder neural networks can be implemented for managing significant amounts of information regularly received by data processing apparatus 102, and two determine a latent space to provide or extract information that is needed for a given operation (e.g., during a respective activation function). One or more implementations of the present disclosure may include stacking artificial neural networks for deep learning, compression, recognition, and accuracy during processes associated with $CO_2$ removal and sequestration analysis.

At least some information provided in accordance with the teachings herein can be configured for blockchain or other distributed ledger technologies. Examples of using blockchain technology in accordance with the teachings herein are shown and described in co-pending U.S. patent application Ser. No. 18/298,493 and filed Apr. 11, 2023, of which the present application is based on, claims priority to, and is incorporated by reference in its entirety.

Figure 3:
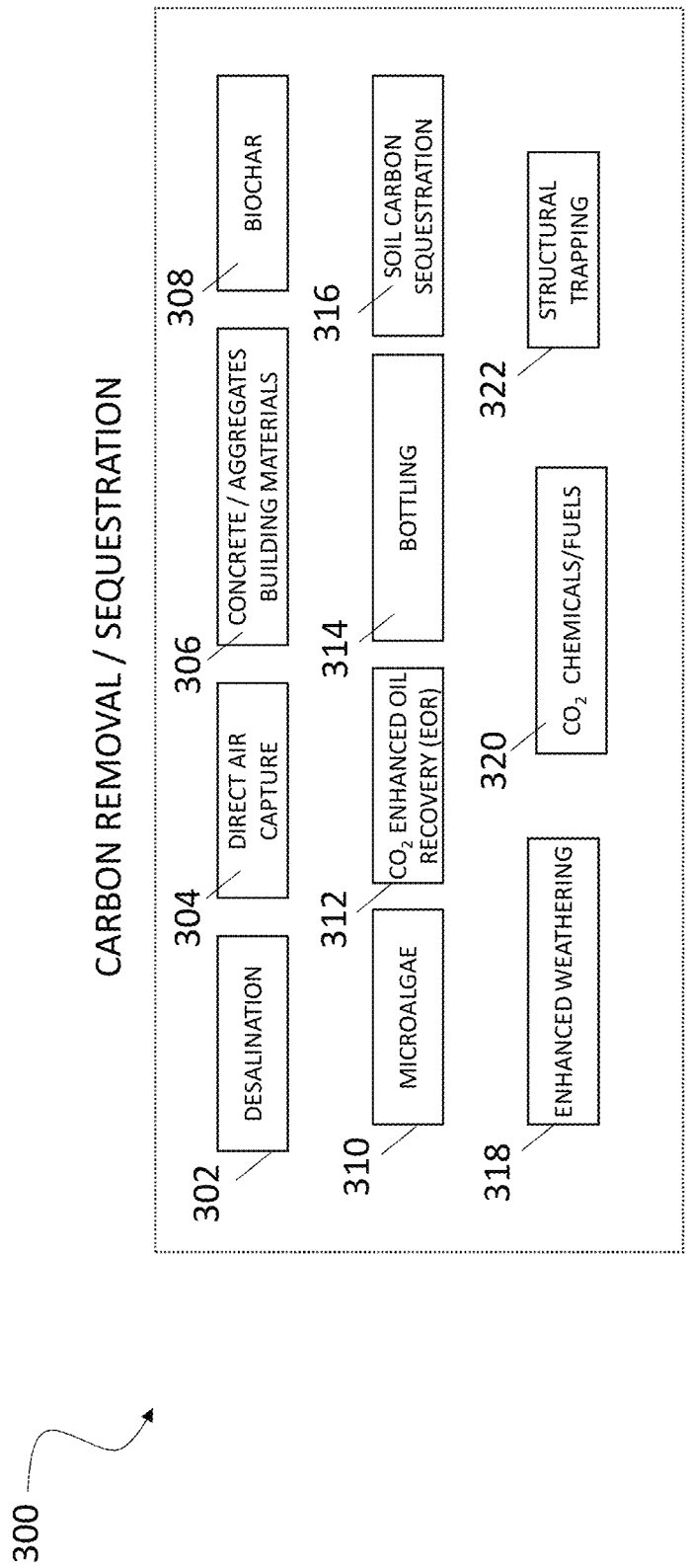
FIG. 3 is a block diagram representing example information and data processing, including associated with respective parties, in an example implementation of the present disclosure.

FIG. 3 is a block diagram illustrating example carbon atmospheric removal and/or sequestration technologies 300, in accordance with one or more implementations of the present disclosure. In the example shown FIG. 3, removal and storage technologies can include desalination 302, direct air capture 304, concrete/aggregates (e.g., building materials) 306, biochar 308, microalgae 310, $CO_2$ enhanced oil recovery ("EOL") 312, bottling 314, soil carbon sequestration 316, enhanced weathering 318, $CO_2$ chemicals and fuels 320, and structural trapping 322. These technologies are described in greater detail herein.

Figure 4A:
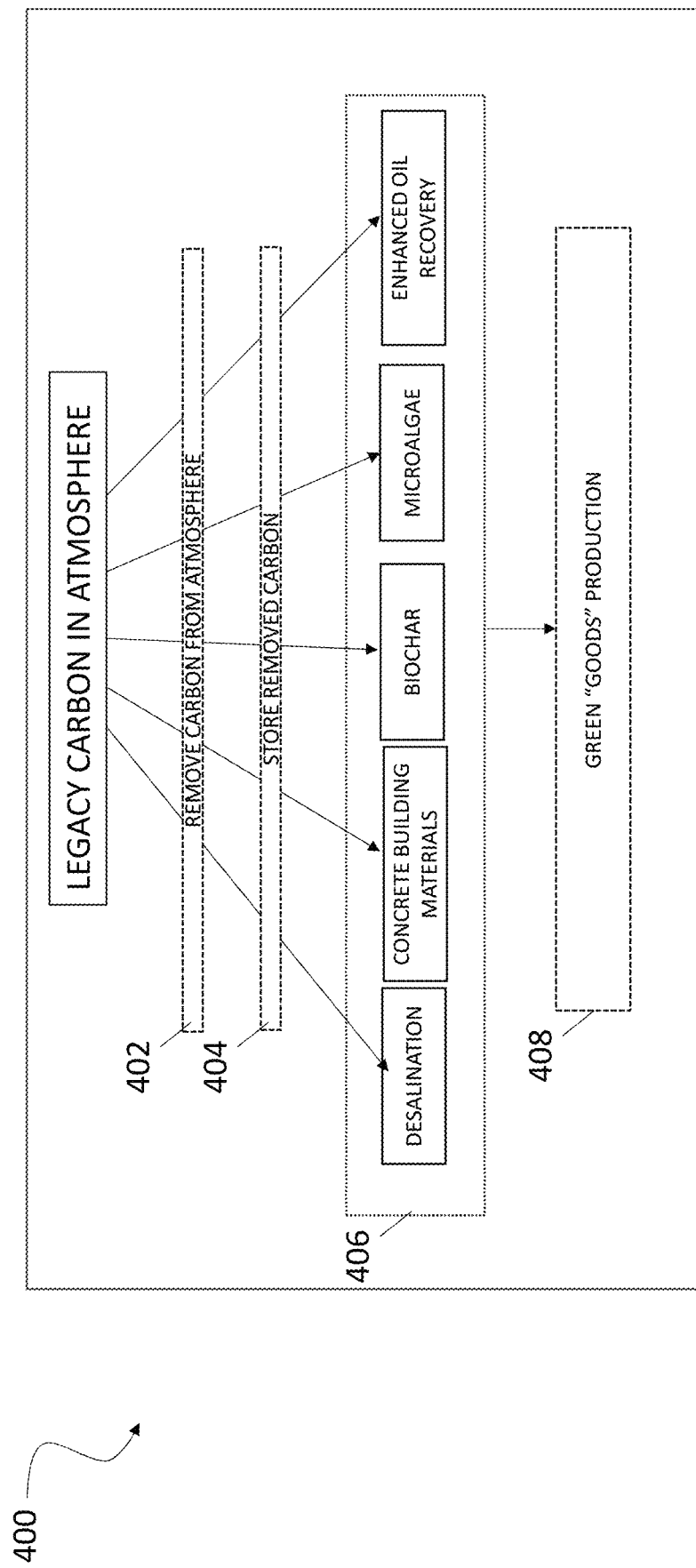
FIG. 4A, a high-level process flow illustrating steps associated with removal of legacy $CO_2$ from the atmosphere.

FIG. 4A is a high-level process flow illustrating steps associated with removal and sequestration of legacy carbon. Once legacy carbon is removed from the atmosphere 402, such as via processes associated with direct air capture 304, microalgae 310, or other suitable techniques, the carbon is stored using one or more technologies 404. Example techniques 406 include desalination 302, production of concrete building materials 306, biochar 308, microalgae 310, enhanced oil recovery processes 312, or the like. The stored $CO_2$ can be further used in production of goods or services 408, such as desalinated drinking water, fuel, cement, polymers, and stones (e.g., diamonds).

Figure 4B:
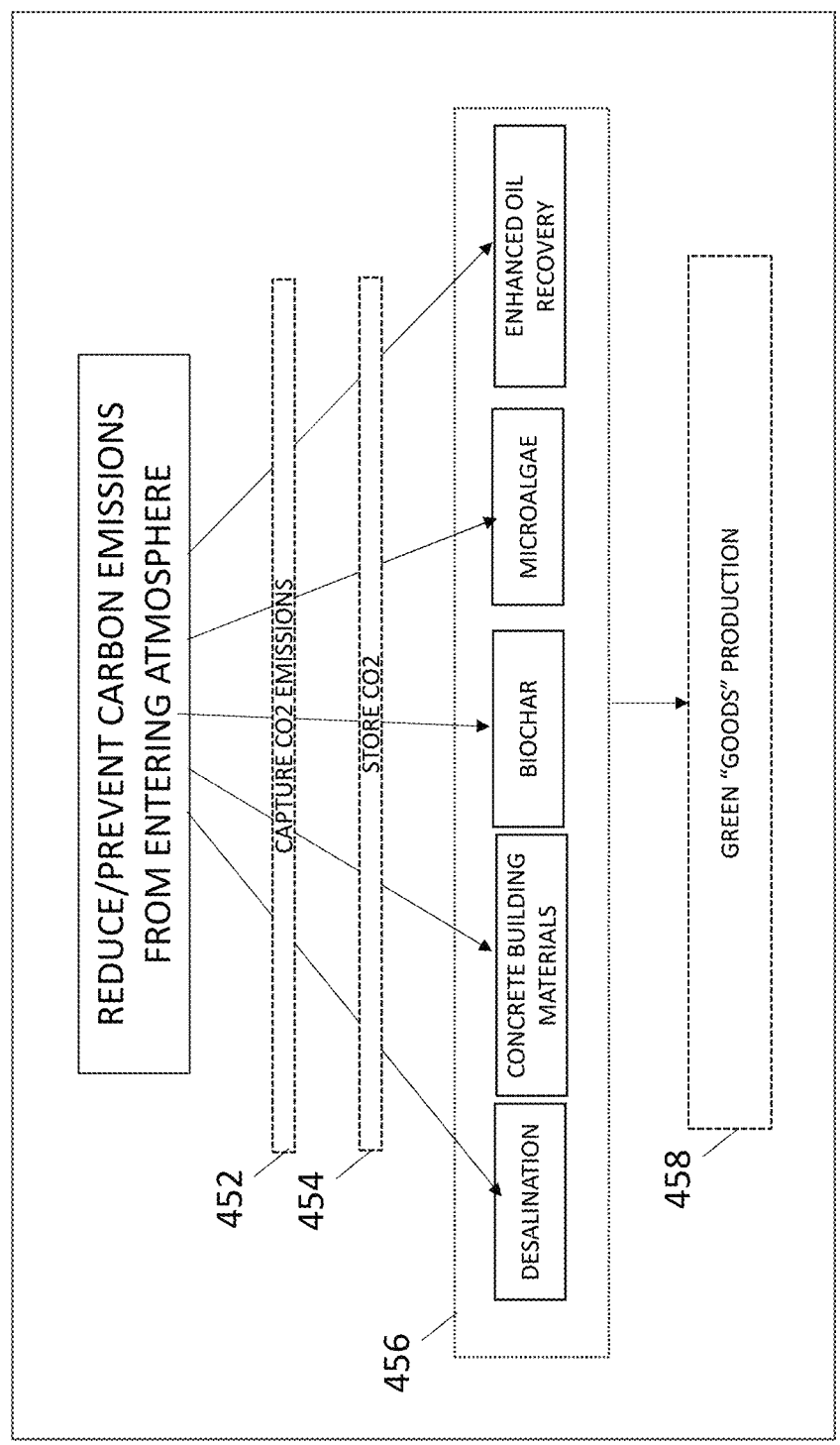
FIG. 4B, a high-level process flow illustrating steps associated with removal of legacy $CO_2$ from the atmosphere.

FIG. 4B is a high-level process flow illustrating steps associated with capture and sequestration of emitted $CO_2$, which is not released into the atmosphere. As shown in FIG.

4A, $CO_2$ is captured and collected, such as $CO_2$ that is emitted during energy production processes 452, including burning fossil fuels. The $CO_2$ is stored 454, such as via various technologies 456, including desalination 302, production of concrete building materials 306, biochar 308, microalgae 310, enhanced oil recovery processes 312, structural trapping 324, or the like. Once captured, the $CO_2$ is stored or otherwise used in production of green goods or services 458, such as desalinated drinking water, fuel, cement, polymers, and stones.

In operation during one or more implementations of the present disclosure, one or more data processing apparatus 102 can receive and process information from each of a plurality of member parties, which represents each member party's association with steps and/or goods/services shown and described herein with regard to FIGS. 4A and 4B. Such steps can include, for example, information representing a member party's involvement with removing legacy carbon, capturing $CO_2$ that is emitted before being released into the atmosphere, long term storage of $CO_2$, and/or with aspects of production and/or use of corresponding green goods and services. Such information can be received and processed by one or more data processing apparatus 102 and compared with current mandates of the respective member party in connection with $CO_2$ and carbon, such as mandates representing amounts of carbon a respective member party is to remove and/or store over a given period of time. In addition (or in the alternative), information associated with production and use of green goods can be accessed and processed by data processing apparatus 102, including to determine whether or the degree with which a given member party is adhering to one or more corresponding mandates.

It is to be appreciated by those of ordinary skill that the systems and methods shown and described herein include technology to configure one or more data processing apparatus 102 to establish and provide membership services to each of a plurality of member parties. Moreover, technology is provided herein to configure each of a plurality of user computing devices 104 as a function of instructions and tools provided by data processing apparatus 102. Such technology is provided to onboard the respective user computing devices 104 to operate within the membership and be availed of membership services. More particularly, instructions and tools provided by data processing apparatus 102 can configure the user computing devices 104 to operate within the membership, including to identify that respective member parties are authorized to operate within the membership, and are adhering to mandates associated with membership. Accordingly, data processing apparatus 102 receives information from onboarded user computing devices 104 representing a respective member party's involvement and operations. Data processing apparatus 102 can process the information received from the respective devices 104, including to generate and/or provide information to the respective user computing devices 104 for downstream processes.

In one or more implementations of the present disclosure, a plurality of data types associated with respective $CO_2$ removal and sequestration technologies can be received and used by data processing apparatus 102 in order to perform operations associated with onboarding and certifying computing devices configured for carbon removal and sequestration in a membership. In one or more implementations of the present disclosure, a party seeking membership transmits information that is received by data processing apparatus 102 and that represents various $CO_2$-related use and/or activity. The information can be processed to determine whether the respective party is a suitable candidate for membership and, if so, whether the party meets a predetermined threshold for inclusion in membership. For example, variables that are identified from data received from a party are assigned values and one or more mathematical operations are performed using the values to arrive at a conclusion. If the conclusion meets the threshold, for example, the result of mathematical calculations performed by data processing apparatus 102 meet one or more values associated with the threshold, the party may be granted admission. In such case, the present disclosure supports configuring one or more computing devices of the admitted party to membership for membership operations shown and described herein. For example, instructions can be provided by information processor to one or more computing devices of a party to configure the device(s) to operate in various modes and in accordance with respective security profiles. For example, a user computing device 104 of a respective member party is configured by executing instructions provided by data processing apparatus 102 that cause the user computing device 104 to automatically collect, format, and/or transmit information, such as shown and described in connection with FIG. 5. Other configurations are supported, as well, including providing automatic notifications, alerts, and information. Moreover, one or more operations associated with a user computing device 104 configuration can be automatically enabled or restricted. For example, in the event of a determination made by data processing apparatus 102 that a member party is not in compliance with a respective mandate or other aspect of the present disclosure, one or more features previously available to a member party via the member party's user computing device 104 can be disabled automatically or otherwise removed. Conversely, in the event of a determination that a member party is in compliance with a respective mandate or other aspect of the present disclosure, one or more features previously available to a member party via the member party's user computing device 104 can be enabled automatically or otherwise added.

Figure 5:
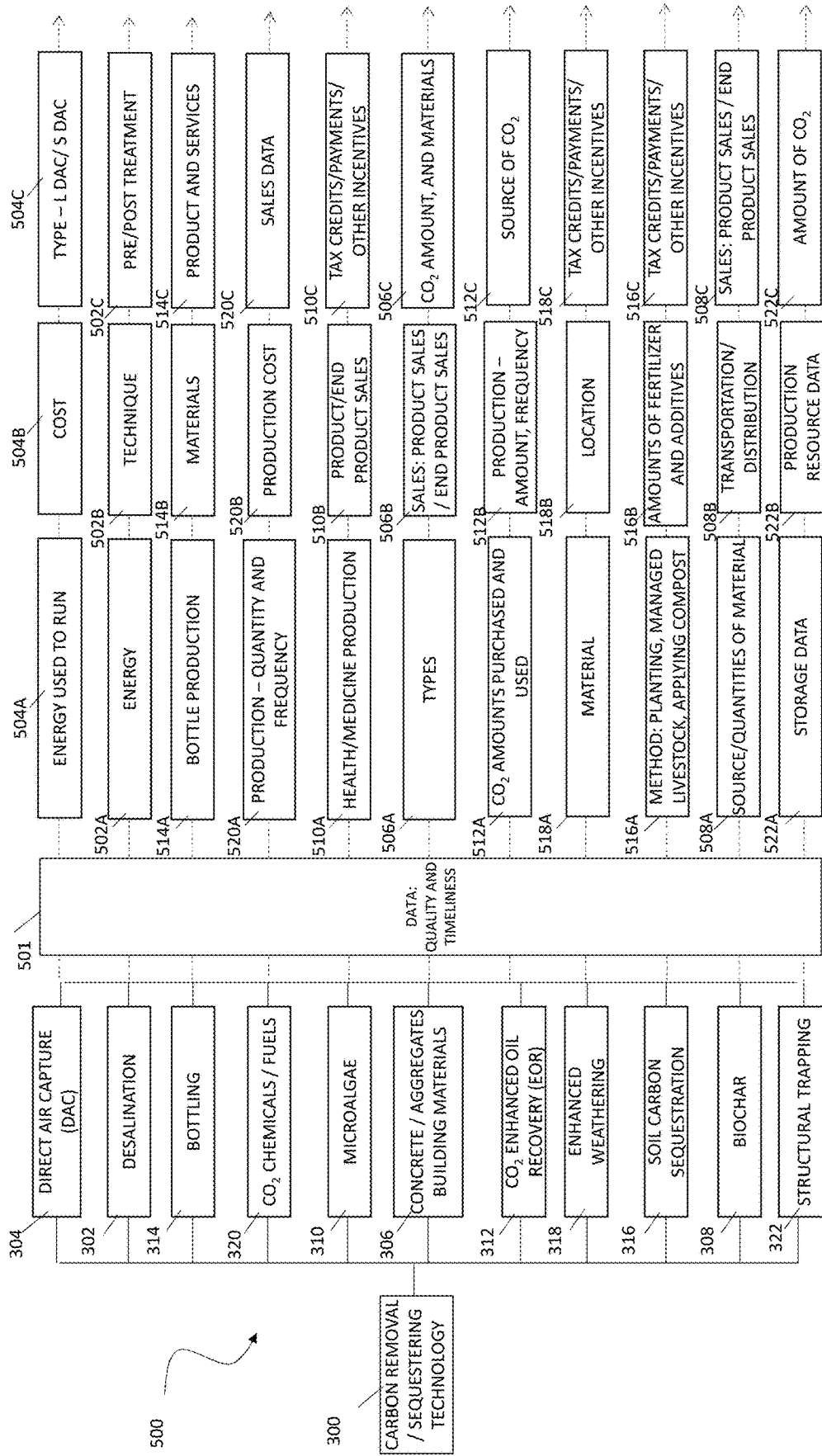
FIG. 5 illustrates a high-level block diagram illustrating a plurality of carbon removal/sequestration technologies and example types of data associated therewith, which are transmitted to and received by at least one data processing apparatus, in accordance with an example implementation of the present disclosure.

FIG. 5 is an example block diagram illustrating example data types and flows of information in connection with carbon removal and sequestering technology that can be received by data processing apparatus 102, in connection with an example implementation of the present disclosure. The respective kinds of information and quality of information 501 can be measured or identified by data processing apparatus 102, including as a function of details of the data, the quantities of the data, and the timeliness of the data. For example, information received from a respective member party may have gaps or missing data, or is aged and not current to the point of not being effective. The kind of data received from member computing devices and the quality thereof can be valued (e.g., weighted) by data processing apparatus 102 during analysis operations. For example, data that are aged or incomplete can be weighted lower than other received data, which are complete, abundant, and current.

While the examples shown and described herein often regard information that is directly related to $CO_2$ removal and storage, the present disclosure is not so limited. Various other data points can be received and processed by data processing apparatus 102 that relate to various aspects of a member party's business and operations. Although certain data received from a respective member party may not bear directly on $CO_2$ removal and sequestration, such data may nevertheless be valuable and important in a holistic approach of determining compliance with membership mandates. For example, sales data that identify significant production and distribution of goods and/or services, but that do not contribute to removal and/or storage of $CO_2$, may serve to contradict (or possibly validate) a member party's assertion of compliance with a respective mandate.

It is to be appreciated that the data types shown in FIG. 5 are exemplary, and that other types and categories of information can be received and processed, according to respective implementations. Still further, although certain examples shown in FIG. 5 may be associated with a respective carbon removal/sequestering technology 300, the present disclosure is not intended to limit any respective data type as being restricted to a respective carbon removal/sequestering technology. Accordingly, various carbon removal/sequestering technologies can share the same data frameworks as others, across various technologies.

Continuing with reference to FIG. 5, one or more member parties provide information regarding respective associations with carbon removal/sequestering technology 300. One respective member party may have association with a plurality of carbon removal and/or sequestering technologies, such as by implementing processes associated with direct air capture 304 that include purchasing and using biochar 308 fuel or other synthetic fuel. Thus, a member party may provide carbon removal technology services and simultaneously purchase one or more products for services that result from carbon removal and sequestering technologies. The present disclosure supports processing complex combinations of data to determine net carbon effects of particular instances of member party activity. Determining net carbon effects can include, for example, whether the carbon effect of goods and/or materials which are used or consumed during production and/or use of a green good and/or service affect (e.g., offset) the reduction of carbon provided by the green good or service. For example, $CO_2$ that is captured during power plant operations and sequestered during enhanced oil recovery, as described herein, can require significant transportation and handling. Such transportation and handling includes operating vehicles and machines that burn fossil fuels, that ultimately offset the carbon sequestering benefits otherwise realized by the enhanced oil recovery operations. The present disclosure includes systems and methods that can calculate the net carbon effect by factoring in a plethora of data points that contribute to reductions (e.g., carbon removal and sequestration), as well as increase (e.g., $CO_2$ emissions).

Continuing with reference to FIG. 5, desalination 302 is shown in which example information types can include the source and amounts of energy 502A used, respective cost data 502B associated with desalinating processes, and process information associated with pre-treatment and post-treatment activities 502C. Additional features and descriptions regarding desalination are provided herein.

Direct air capture 304 information can represent processes and contributing factors associated with extraction of $CO_2$ directly from the atmosphere, as opposed to carbon capture that occurs at the point of emissions. Generally, direct air capture 304 regards capturing atmospheric air, performing a series of chemical reactions on the air, and extracting $CO_2$ from the air before releasing the air (minus the $CO_2$) back into the atmosphere. $CO_2$ that is extracted during direct air capture processes can be trapped as a carbonate and further processed, such as for production of $CO_2$ in liquid or concentrated gas form for downstream use and/or storage. $CO_2$ that is extracted from the atmosphere is, typically, more dilute than other concentrations of $CO_2$, such as those that are otherwise emitted during power station or other industry plant operations. This can result in various key datapoints, including those representing operation energy source 504A (e.g., fossil fuel-based energy, "green" renewed energy, or the like), energy costs 504B, and carbon storage types 504C (e.g., LDAC or SDAC respectively representing liquid or solid storage types), or various other data types, including plant locations, output, or the like.

Continuing with reference to FIG. 5, data associated with concrete/aggregate building materials 306 can include production and sale of building materials and associated goods associated with sequestered $CO_2$. Example data received by data processing apparatus 102 can include types of material 506A, such as cement, aggregate, polymer, or other material. Further, sales data 506B of building materials can be received and processed by data processing apparatus 102, and can represent amounts of materials that are produced and, accordingly, the amount of $CO_2$ that is sequestered in product. Other sales data 506B can include end-product sales, such as numbers of discrete units of building materials comprising stored carbon that are purchased or sold by a respective member party, thereby representing that member party's contribution to carbon reduction. Still further, data 506C can be received and processed, for example, representing amounts of $CO_2$ that was purchased and/or used during production, as well as materials that were used during production, various energy costs, or the like. Data processing apparatus 102 can process these and other data received from respective member parties to determine a net carbon effect and/or a degree by which a respective member party is in compliance with a respective mandate.

Continuing with reference to FIG. 5, data associated with biochar 308 can represent respective sources and quantities of materials 508A that are used during production of biochar. Biochar can be produced as a function of thermochemical conversion (e.g., via a particular burning process) of a source, such as agricultural waste, wood chips, manure, or the like, resulting in a solid material in which carbon, now converted into a stable form, is stored. Source material (i.e., "feedstock") associated with biochar 308 can be particularly important in $CO_2$ reduction and/or removal, as certain feedstock may release higher concentrations of $CO_2$ than others or may require additional energy, cost, or effort to convert. In addition to sources and quantities of materials 508A, other types of data received and processed by data processing apparatus 102 can include transportation and/or distribution data 508B, which can represent distribution costs or other records associated with production and sale of biochar. Still further, sales data 508C can be received and processed by data processing apparatus 102, which can represent amounts of biochar that are sold and, accordingly, the amount of $CO_2$ that is sequestered. Other sales data 508B can include end-product sales and development, such of construction materials or other end-products that are purchased or sold by a respective member party, thereby representing that member party's contribution to carbon reduction and/or compliance with respective membership mandate(s).

Continuing with reference to FIG. 5, data associated with microalgae 310 can be received and processed, including to represent $CO_2$ that is sequestered via microorganisms. Example data received and processed by data processing 102 can include types and quantities of respective end-products 510A that are produced and/or enhanced via microalgae, such as in connection with pharmaceuticals, biomedicine, cosmetics, and chemical production. In addition, information received and processed by data processing apparatus 102 can include transportation and/or distribution data 510B, which can represent distribution costs or other records associated with production and sale of microalgae and/or end-products (or aspects thereof) that are developed thereby. Still further, tax credit, payments, or other incentives data 510C can be received and processed by data processing apparatus 102, which can represent financial incentives associated with microalgae development and production, as well as for goods and services that use microalgae. Such information can be processed by data processing apparatus 102 to contribute to a representation of a member party's contribution to carbon reduction and/or compliance with respective mandate(s).

Continuing with reference to FIG. 5, data associated with $CO_2$ enhanced oil recovery ("$CO_2$ EOR") 312 can be received and processed, including to represent $CO_2$ that is sequestered in an oil reservoir or other natural formations during oil extraction. $CO_2$ EOR can include pumping liquified $CO_2$ into an oil reservoir for extraction, which can increase output and, accordingly, reduce the need for new drilling. Example data received and processed by data processing 102 can include amounts of $CO_2$ purchased and used 512A, such as over a period of time. Other data can include oil production data 512B, which can represent amount and frequency of oil production, which can be processed to determine degrees and/or amounts of $CO_2$ that has been sequestered as a function of $CO_2$ EOR. Moreover, source of $CO_2$ data 512C can represent the source of $CO_2$ that is used during $CO_2$ EOR. In the case of $CO_2$ EOR, as well as other carbon removal/sequestering technologies, the source of $CO_2$ can be highly relevant, such as in instances where the $CO_2$ used in a respective process was extracted via direct air capture or was otherwise provided from legacy carbon removal practices.

Continuing with reference to FIG. 5, data associated with bottling 314 can be received and processed, including to represent $CO_2$ that is sequestered as a function of producing bottles or related products, as well as services associated therewith. For example, bottle production data 514A can be received and processed by data processing apparatus 102 that represent quantities of bottles that are produced, purchased, or otherwise associated with a respective member party. Data 514A can include bottles that do (or do not) include sequestered $CO_2$. In addition, materials data 514B can be received and processed, which can represent respective materials used in the production of bottles and/or related products/services, including glass, aluminum, bag-in-box, or the like. Further, respective product and service data 514C can be received and processed by data processing apparatus 102, which can represent closures, labels, packaging, warehousing, boxing, sealing, and other related goods and services which can have an impact on the net effect of carbon reduction.

Continuing with reference to FIG. 5, data associated with soil carbon sequestration 316 can be received and processed, including to represent $CO_2$ that is sequestered in soil. For example, soil management methods data 516A can be received and processed by data processing apparatus 102 that represent various activities (or lack thereof) in connection with carbon (including $CO_2$). For example, methods data 516A can represent a member party's refraining from disturbing soil or materials that contain $CO_2$ to prevent the $CO_2$ from being released in emitted into the atmosphere. Other methods data 516A can include respective planting techniques (e.g., to planting at certain times or places that are known to reduce $CO_2$ emissions), livestock management (e.g., to preclude the release of $CO_2$ into the atmosphere), and use of compost or other materials that can decrease $CO_2$ production. Additives data 516B can include information representing amounts of fertilizer or other additives that are being used by a respective member party and/or process associated with soil carbon sequestration, which can represent the reduction, addition, and/or degree of $CO_2$ that is being produced and/or emitted. For example, a significant reduction in the use of fertilizer can represent that a respective member party is actively reducing $CO_2$ emissions. Still further, tax credit, payments, or other incentives data 516C can be received and processed by data processing apparatus 102, which can represent financial incentives associated with soil carbon sequestration development and production, as well as for goods and services that result or are otherwise involved therewith. Such information can be processed by data processing apparatus 102 to contribute to a representation of a member party's contribution to carbon reduction and/or compliance with respective mandate(s).

Continuing with reference to FIG. 5, data associated with enhanced weathering 318 can be received and processed, including to represent $CO_2$ that is sequestered as a function of enhanced weathering techniques. In enhanced weathering 318, ground minerals can be added in a particular environment and used to capture and remove significant amounts of $CO_2$. For example, ground up silicon rock can be added to a beachfront, where wave activity increases alkalinity and increased $CO_2$ capture minerals can be applied to farm fields, as well, such as in the midwestern portions of the United States, which can further capture and sequester $CO_2$. Example data received in connection with enhanced weathering 318 can include data 518A representing types and quantities of materials used in the process, such as silicate or other material. Other data 518B can include respective locations where enhanced weathering processes are implemented, such as beach or farm locations. Still further, tax credit (e.g., under Section 45Q of the Internal Revenue Code), payments, or other incentives data 518C can be received and processed by data processing apparatus 102, which can represent financial incentives associated with enhanced weathering, development and production, as well as for goods and services associated therewith. Such information can be processed by data processing apparatus 102 to contribute to a representation of a member party's contribution to carbon reduction and/or compliance with respective mandate(s).

Continuing with reference to FIG. 5, data associated with $CO_2$ chemicals and fuels 320 can be received and processed, including to represent $CO_2$ that is used as a feedstock in chemical and fuel production. Converting $CO_2$ to commodity chemicals and fuels, such as for production of salicylic acid, carbonates, and methanol, can remove $CO_2$ effectively and reduce demand on otherwise nonrenewable energy. Example data received by data processing apparatus 102 in connection with $CO_2$ chemicals and fuels 320 can include production data 520A, representing types and quantities of $CO_2$ chemicals and fuels produced, purchased, and/or used by a respective member party. Production resource data 520B can include information representing energy and associated costs required for production of a respective $CO_2$ chemical and/or fuel. Further, respective locations where enhanced weathering processes are implemented, such as beach or farm locations. Still further, sales data 520C can be received and processed by data processing apparatus 102, which can represent amounts of $CO_2$ chemicals and fuels that are sold and, accordingly, the amount of $CO_2$ that is sequestered. Other sales data 508B can include end-product and/or use sales that are purchased or sold by a respective member party, thereby representing that member party's contribution to carbon removal and/or compliance with respective mandate(s).

Continuing with reference to FIG. 5, data associated with structural trapping of $CO_2$ 322, including to represent long term storage of $CO_2$ that has been injected in rock layers and faults. Structural trapping 322 can be associated with $CO_2$ enhanced oil recovery 312, as shown and described herein. In practice, structural trapping involves liquified $CO_2$ interacting with minerals for storage, including $HCO_3$, solid carbonate minerals (as in desalination), and $MgCO_3$, which are effective to sequester $CO_2$. Example data received in connection with structural trapping 322 can include storage data 522A, which can represent particular formations and characteristics of locations where large amounts of $CO_2$ are stored. Production resource data 522B can include information representing energy and associated costs required for structural trapping. For example, production resource data can include costs of $CO_2$, as well as associated costs such As for transporting and handling large quantities of $CO_2$. Still further, amount of $CO_2$ data 520C can be received and processed by data processing apparatus 102, which can represent amounts of $CO_2$ used in structural trapping processes over a given period of time. In one or more implementations of the present disclosure, Data 502C may be provided by one member party who provides $CO_2$ to another member party for structural trapping purposes. Sales of $CO_2$, therefore, can be highly relevant in connection with determining structural trapping operations and, further, a respective member party's compliance with one or more mandates associated with membership.

At least some information provided in accordance with the teachings herein can be configured for blockchain or other distributed ledger technologies. Examples of using blockchain technology in accordance with the teachings herein are shown and described in co-pending U.S. patent application Ser. No. 18/298,493 and filed Apr. 11, 2023, of which the present application is based on, claims priority to, and is incorporated by reference in its entirety.

Figure 6:
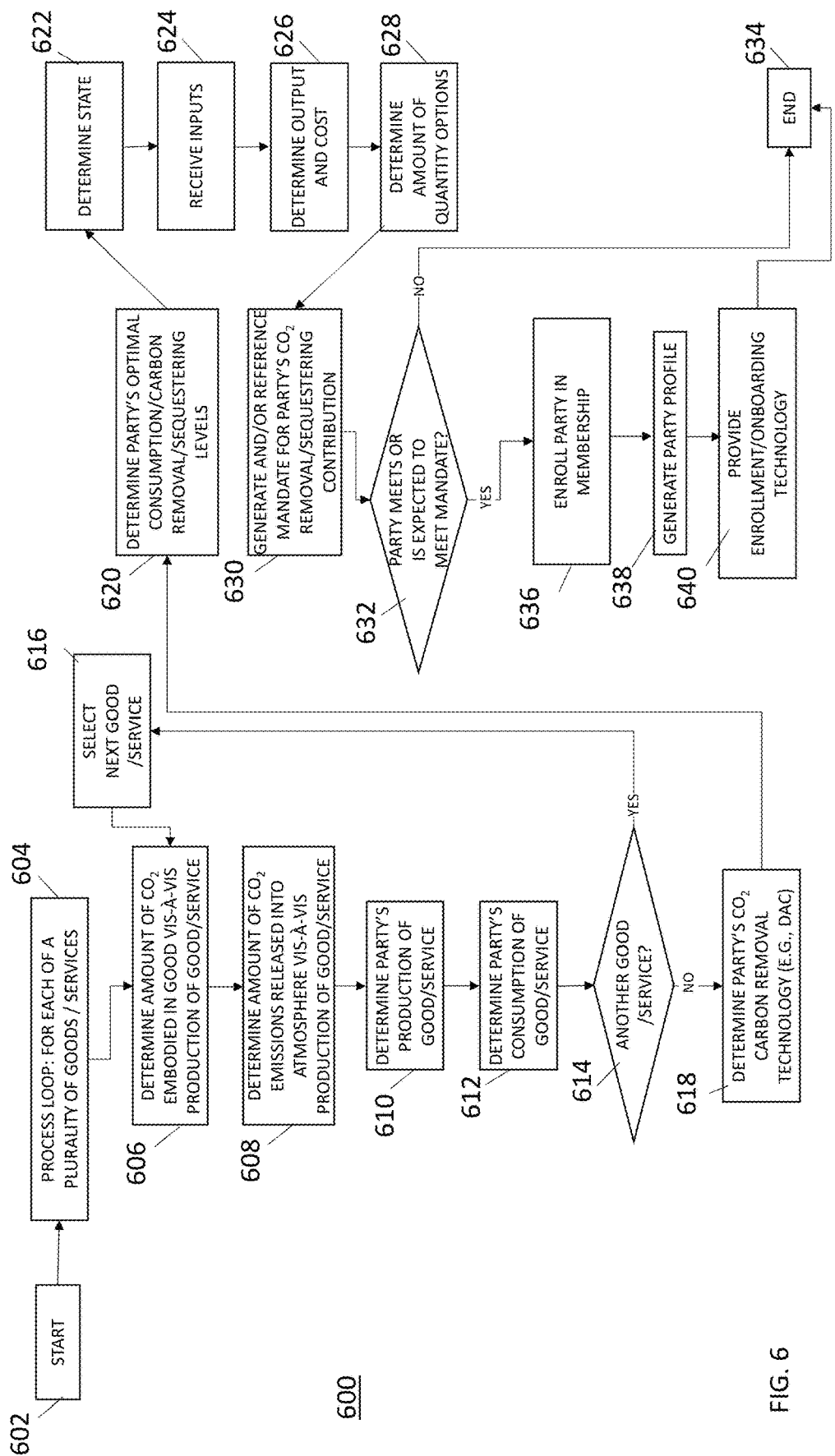
FIG. 6 is a flowchart illustrating example steps associated with enrollment and onboarding of user computing devices, in accordance with one or more implementations of the present disclosure.

FIG. 6 is a flow chart illustrating example steps 600 that are associated with enrolling a party and onboarding at least one associated computing device in accordance with an example implementation of the present disclosure. It should be appreciated that several of the logical operations described herein are implemented (1) as a sequence of computer implemented acts or program modules running on a communication device and/or (2) as interconnected machine logic circuits or circuit modules within a communication device. The implementation is a matter of choice dependent on the requirements of the device (e.g., size, energy, consumption, performance, etc.). Accordingly, the logical operations described herein are referred to variously as operations, structural devices, acts, or modules. Several of these operations, structural devices, acts and modules can be implemented in software, in firmware, in special purpose digital logic, and any combination thereof. It should also be appreciated that more or fewer operations can be performed than shown in the figures and described herein. These operations can also be performed in a different order than those described herein.

In the example steps shown in FIG. 6, the process starts at step 602 and, thereafter, a process loop is implemented for each of a plurality of goods and/or services (step 604). Thereafter at step 606, a determination is made of the amount of $CO_2$ that is embodied vis-à-vis production of the good/service. Moreover, the amount of $CO_2$ emitted into the atmosphere vis-à-vis production of the good/service is also determined (step 608). At step 610, a determination is made regarding the respective party's production of the good/service. For example, a determination of the quantity of goods the party produces over a period of time is made. In addition, a determination is made of the party's consumption of the respective good and/or service (step 612). Information representing a party's production of a good and/or service, as well as information representing a party's consumption of a good and/or service can be provided by the party and/or a third-party associated therewith.

Continuing with reference to FIG. 6, at step 614 a determination is made whether another good and/or service is produced and/or consumed by the party. If so, then the process branches two step 616 and the next good/service is selected. Alternatively, if the determination at step 614 is negative, then the process branches to step 618 and a determination is made of the party's $CO_2$ carbon removal technology, if any. Thereafter, a determination is made regarding optimal levels of the party consumption and/or carbon removal/sequestering levels (step 620). For example, a state of the party's operations, materials, history, goods and services that are provided and used can be factored in a determination of optimal levels (step 622). In addition, respective inputs can be received and used to be factored in a determination of optimal levels (step 624). Moreover, information associated with good/service output and costs can be received and used to be factored in a determination of optimal levels (step 626). In addition, respective quantity options, such as amounts of materials used in production, goods or services produced or purchased in connection with production, human resources, or other respective quantities associated with a party can be received and used to be factored in a determination of optimal levels (step 628). Of course, one of ordinary skill in the art will recognize that other variables and factors associated with a respective party can be received and used to be factored in a determination of optimal levels, depending on a respective implementation.

Continuing with reference to FIG. 6, at step 630 a mandate is generated and/or referenced for the party's $CO_2$ removal/sequestering contribution. For example, such contribution may include production of one or more goods that remove or sequester $CO_2$. Alternatively, such contribution may include purchasing one or more goods or services that involve removal or sequestering of $CO_2$. In yet another example, a mandate may require a balance between making, using, buying, or selling goods sequestering $CO_2$ is sequestered and goods that do not. For example, a mandate of the party adhering to a simple ratio of making, using, buying, or selling goods that sequester $CO_2$ to goods that do not sequester $CO_2$ can be referenced and/or made. At step 632 a determination is made whether the party meets or is expected to meet the mandate. If so, then the process branches to step 636 and the party is enrolled in membership. Moreover, at step 638 a profile is generated for the party that can be used and referenced in the future by data processing apparatus 102 in connection with providing membership services as shown and described herein. From there, the process continues to step 640 and enrollment and onboarding technology is provided to at least one user computing device 104 of the party. For example, software is distributed that is executed by the user computing device 104 that configures the computing device 2 operate in accordance with the teachings here in. In addition, or in the alternative, security features are provided, such as in the form of encryption keys and certificates that provide security authorization and access to the user computing device 104 in connection with membership services, shown and described herein. Thereafter the process continues to step 634 and ends. Alternatively, if the determination at step 632 is that the party is not expected to meet or does not meet the mandate generated and/or referenced in step 630, then the process branches to step 634 and ends.

Thus, as shown and described with regard to FIG. 6, the present disclosure supports receiving information by a respective party, such as shown and described herein with reference to FIG. 5, and determining whether the party is suitable for enrollment as a member.

Figure 7A:
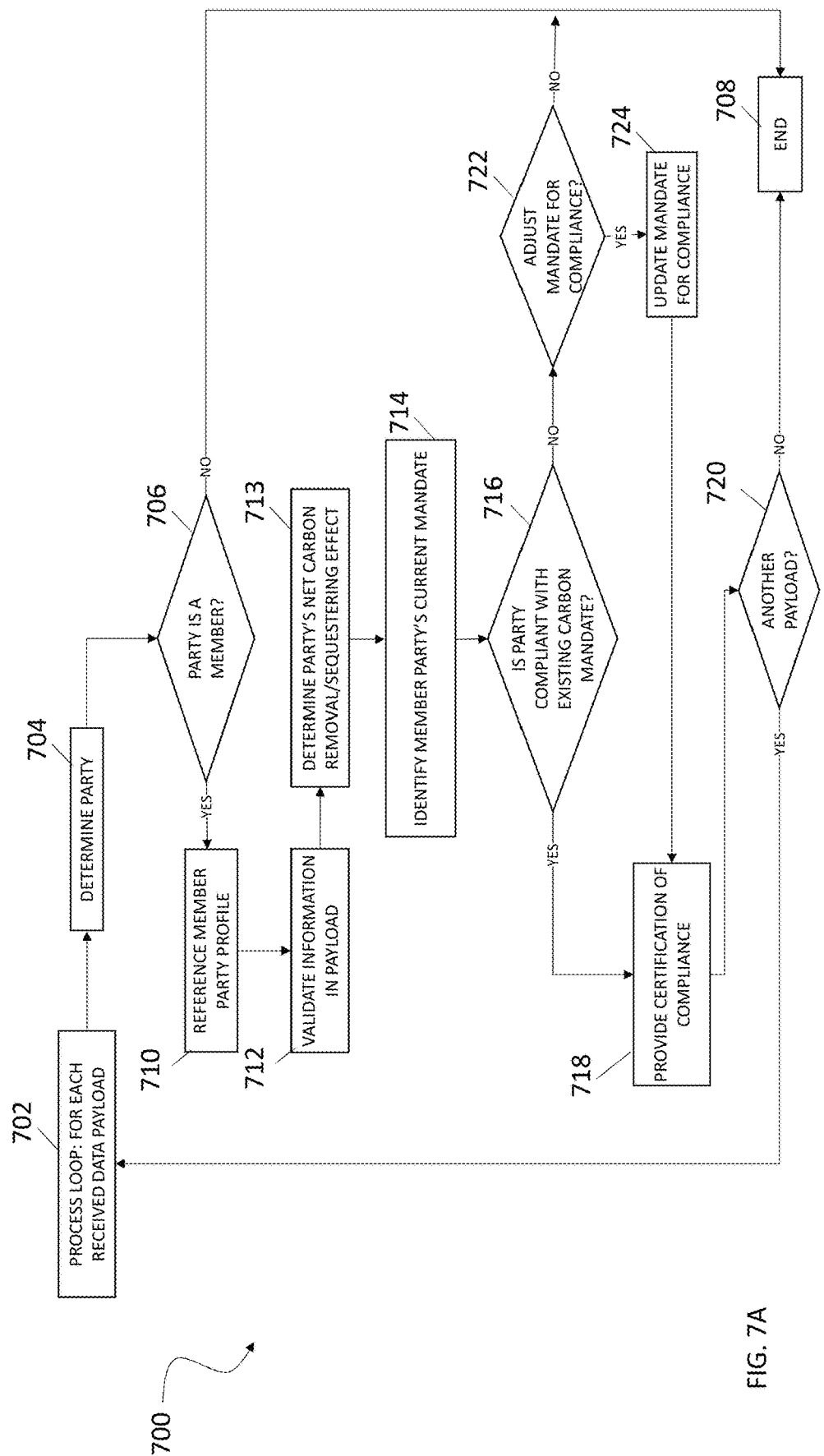
FIG. 7A is a flowchart illustrating example steps associated with maintaining membership activity and mandates, in accordance with one or more implementations of the present disclosure.

FIG. 7A is a flow chart illustrating example steps 700 in connection with data processing and associated services in connection with an example membership. At step 702, a process loop is executed for each received data payload. Information associated with the data payload can include identification of and security authorization submitted by a party, as well as corresponding information associated with the party's activities, such as shown and described herein with reference to FIG. 5. At step 704, a party associated with the respective data payload is identified. At step 706, a determination is made whether the respective party associated with the data payload is a current member party. If not, then the process branches to step 708 and ends. Alternatively, if the determination at step 706 is affirmative, then the process branches to step 710 and a profile associated with the member party is referenced. Thereafter, the process continues to step 712, and at least some of the information set forth in the data payload is validated. For example, information representing production of a green good, sales of a green good, and tax credits associated with a green good are provided in the data payload. In one or more implementations of the present disclosure, such information is provided by a third party or verified by a third party as a function of encrypting the information with an encryption key. If the encryption key is available and usable to decrypt and validate the information in the data payload, the process continues to step 713, and information set forth in the data payload is processed to identify a net carbon removal/sequestering effect. For example, information in the data payload regards the party's direct air capture production. Information associated with the type of direct air capture and an estimated amount of $CO_2$ is provided in the data payload. Using one or more processes, such as in accordance with one or more activation functions executed by one or more nodes in an artificial neural network, information associated with the amount of energy used to extract the estimated $CO_2$ as well as costs associated therewith are referenced and used to calculate a net carbon removal/sequestering effect. It is to be appreciated that determining a party's net carbon removal/sequestering effect in step 713 can include processing various data received by data processing apparatus 102, including as shown and described herein with reference to FIG. 5. A party's activities with regard to carbon removal and/or sequestration, including active steps associated with removing and/or storing carbon in stable materials, as well as providing goods and/or services associated with removed and/or stored carbon, as well as purchasing goods and/or services associated with removed and/or stored carbon, can all be factored into determining the party's net carbon removal/sequestering effect in step 713. As noted herein, one or more artificial neural networks can be employed to automatically recognize information associated with a party's net carbon removal/sequestering effect, as well as to apply weight thereto and perform various calculations thereon during processing associated with step 713.

Continuing with reference to FIG. 7A, following step 713, a mandate associated with the party's carbon removal and/or sequestering practices is identified (step 714). For example, a profile associated with the party is accessed by the data processing apparatus 102 and information regarding the mandate is referenced therein. At step 716, a determination is made whether the party is compliant with its existing carbon removal slash sequestering mandate. If the determination at step 716 is affirmative, then data processing apparatus 102 provides a certification of compliance, such as by transmitting a certification representing the party's compliance with a respective mandate to a computing device associated with the party. In addition, data processing apparatus 102 can adjust or otherwise maintain the current mandate for the party, such as in case a determination is made by data processing apparatus 102 that the party's mandate is not appropriate given circumstances associated with the party. Thereafter, the process continues to step 720 and a determination is made whether there is another data payload to process. If so, then the process branches to step 702. Alternatively, if no additional data payloads require processing, then the process branches to step 708 and ends. Alternatively, if the determination in step 716 is that the party is not in compliance with its existing carbon mandate, then the process branches to step 722 and a determination is made whether an adjustment to the mandate for compliance is to be made. One or more implementations of the present disclosure may include setting thresholds and conditions by which mandates for member parties can be adjusted. At step 722, if the determination is negative and the party is not in compliance, then the process branches to step 708 and ends. Alternatively, if the determination is that the mandate can be adjusted, then the process branches to step 724 and the mandate is updated, thereby representing the party is in compliance. Thereafter, the process continues to step 718.

Thus, as shown and described with reference to FIG. 7A, the present disclosure includes processes for data processing apparatus 102 to monitor, maintain, and enforce mandates and terms associated with membership, including for carbon removal and sequestering.

Figure 7B:
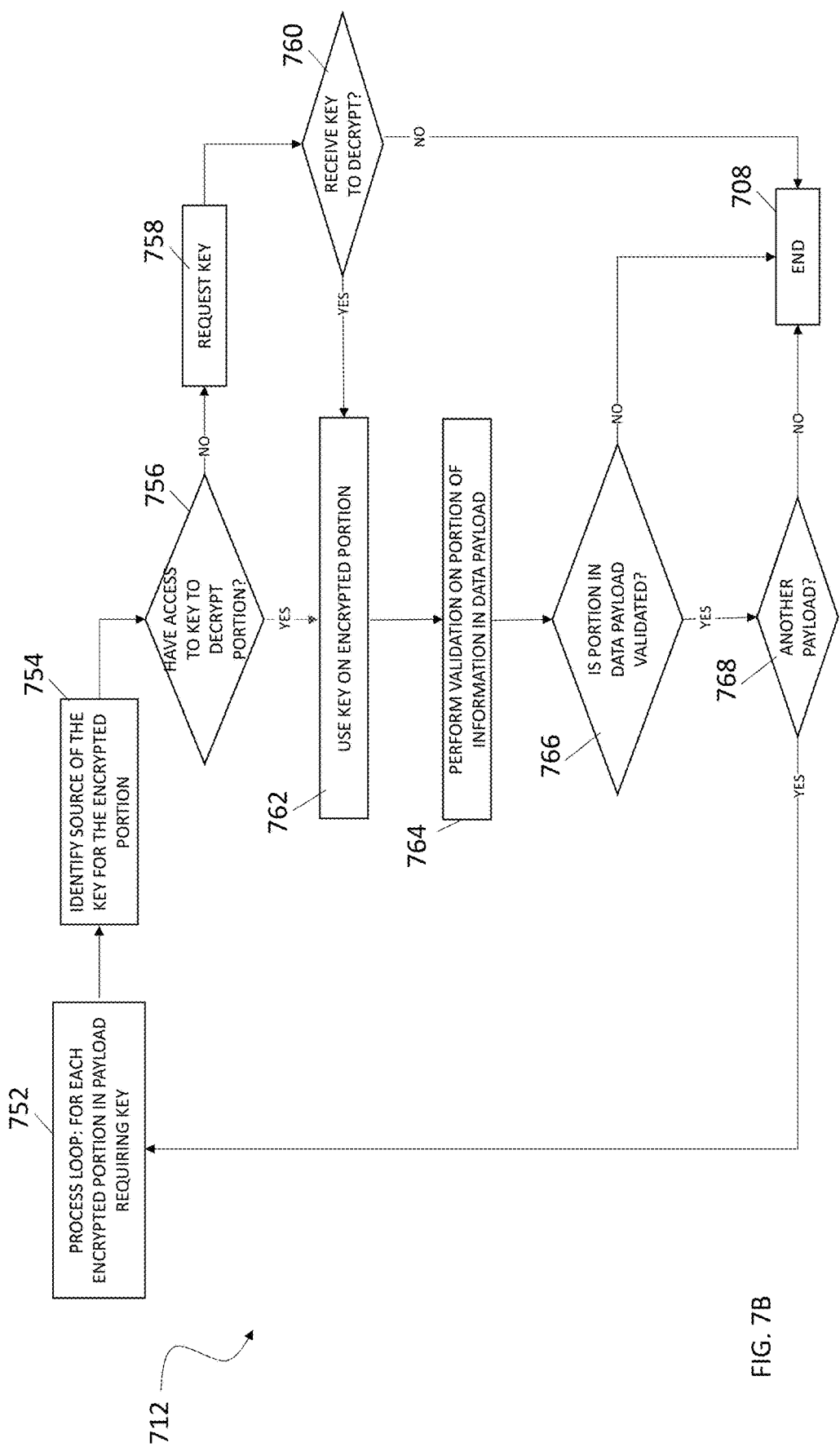
FIG. 7B is a flowchart illustrating example steps associated with validating information in a data payload, in accordance with one or more implementations of the present disclosure.

FIG. 7B is a flowchart illustrating example steps associated with validating information in a data payload, in accordance with one or more implementations of the present disclosure, and substantially as set forth in step 712 (FIG. 7A). At step 752, a process loop is executed for each encrypted portion received in a data payload, which requires a key to decrypt. At step 754, the source of the encryption key is identified and at step 756, a determination is made whether access to the key to encrypt the portion is available. For example, the key can be provided in a subsequent or preceding transmission by a party or a third party (e.g., the source). Alternatively, the key can be stored in a keystore or other secure way. If not, then at step 758 a request for the key is transmitted, for example, to a party that provided the information in the payload, such as a buyer or seller of a green good. At step 760, a determination is made whether the key to decrypt the portion has been received. If not, then the process branches to step 708 (FIG. 7A) and ends. Alternatively, if the determination at step 756 or the determination at step 760 is affirmative, then the process branches to step 762 and the key is used on the encrypted portion. Thereafter, the process continues to step 764 and validation is performed on the portion of the data payload. At step 766, a determination is made whether the portion of the data payload is validated. For example, if decryption is unsuccessful using the key, then the portion of the data payload is deemed invalid. In another example, successfully decrypted information in the portion of the data payload is cross-referenced with other information set forth in the data payload to confirm accuracy and validity thereof. In the event that the determination in step 766 is negative, then the process branches to step 708 (FIG. 7A) and ends. Alternatively, if the determination in step 766 is affirmative, then the process branches to step 768 and a determination is made whether there is another encrypted portion in the data payload to process. If so, then the process branches to step 752. Alternatively, if no encrypted portion in the data payload requires processing, then the process branches to step 708 and ends.

Figure 8:
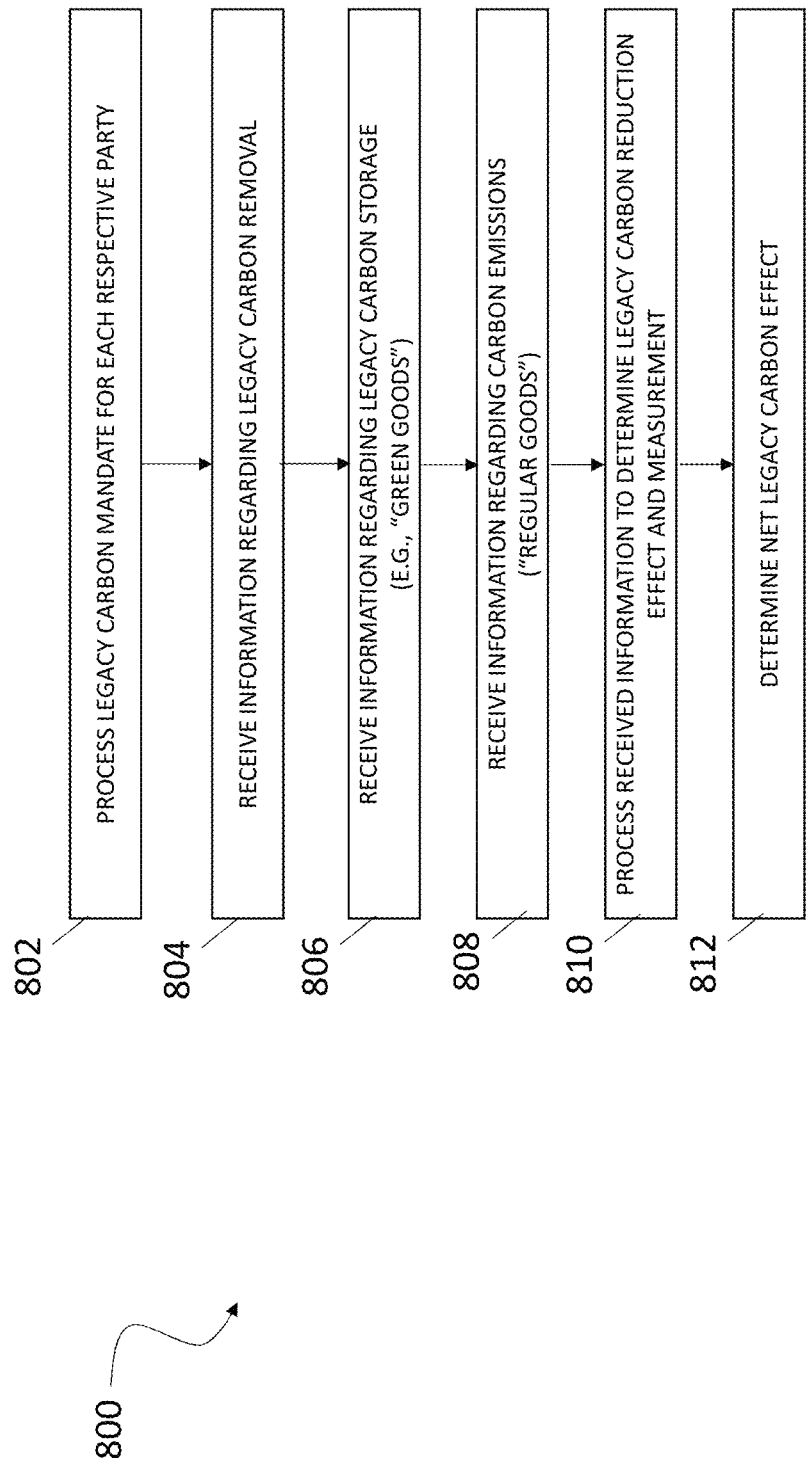
FIG. 8 illustrates a high-level process flow, associated with determining net legacy carbon effect in accordance with an example implementation of the present disclosure.

FIG. 8 illustrates another high-level process flow 800 associated with determining net legacy carbon effect, in accordance with an example implementation of the present disclosure. At step 802, information representing a mandate for each respective member party, as described above and defined as a function of each party's membership. At step 804, information representing legacy carbon removal is received. At step 806, information representing legacy carbon storage (e.g., as a result of production of green goods) is received and, thereafter, at step 808 information representing carbon emissions (e.g., as a result of production of regular goods) is received. At step 810, the received information is processed to determine each respective party's legacy carbon reduction effect and measurement. Thereafter, at step 812, the net legacy carbon effect for all parties (e.g., the membership) is determined.

The carbon removal membership of the present disclosure efficiently and simultaneously serves a vital purpose: to resolve the planet's current water crisis and climate change in a timely and expeditious manner. The present disclosure includes systems and processes associated with a commercial market for $CO_2$ gas or for $CO_2$ in liquid form. $CO_2$ is recognized herein as a traded commodity and commercially used, for example, for production of beverages, for water desalination, for producing cement, stone, aggregate and other building materials, fertilizers, polymers, for carbon fibers that can replace metals, and for producing synthetic fuels such as synthetic gasoline, among others. These uses can, in some cases, sequester and/or stabilize $CO_2$ in varying forms and amounts. It is recognized herein that the commercial market for $CO_2$ various in cost per ton, for example, depending on the $CO_2$ use, location, form (e.g., liquified or gas), and whether or not it is purified for human consumption, such as to produce beer, champagne or other carbonated beverages. Accordingly, the price of $CO_2$ may change, depending on certain variables such as usage and location, as this can affect transportation costs which may represent the largest cost component.

As noted herein, the present disclosure provides for improved technological innovations for managing information and associated technologies, including for reduction of legacy $CO_2$ and for capturing and sequestering $CO_2$ In one or more implementations, as noted herein, the process of desalinating water can capture and store the legacy $CO_2$. Desalination processes, including as or to be used by the world's water companies provides for commercially feasible technology to capture and store legacy $CO_2$.

The present disclosure contributes to resolving a global crisis regarding an ever-increasing lack of water, as well as to reduce legacy $CO_2$ in the atmosphere, thereby providing massive positive environmental and climatic effects. The present disclosure provides for powerful and useful solutions, including to provide for commercial gain, improved resource management, and environmental well-being.

The circular economy and efficiency are the keys to a more sustainable future. For this reason, more and more are committed to developing $CO_2$ capture and use (CCU) technologies, an alternative to $CO_2$ capture and storage (CCS). As noted herein, products derived from $CO_2$ can be used for production of plastics, fuels, fertilizers, cement or food in a circular way, but in this case, water has a special attraction, since it is transformed into a carbon negative and water positive unitary process.

While operations shown and described herein may be in a particular order, this should not be understood as requiring that such operations be performed in the particular order shown or in sequential order, or that all illustrated operations be performed, to achieve desirable results. In certain circumstances, multitasking and parallel processing can be advantageous. Moreover, the separation of various system components in the embodiments described above should not be understood as requiring such separation in all embodiments, and it should be understood that the described program components and systems can generally be integrated together in a single software product or packaged into multiple software products.

It is to be appreciated that the respective member parties associated with the present disclosure can take various forms, including individuals, partnerships, corporations, and even countries.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this disclosure, specify the presence of stated features, integers, steps, operations, elements, and/or components, but do not preclude the presence or addition of one or more other features, integers, steps, operations, elements, components, and/or groups thereof.

It should be noted that use of ordinal terms such as "first," "second," "third," etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

Also, the phraseology and terminology used herein is for the purpose of description and should not be regarded as limiting. The use of "including," "comprising," or "having," "containing," "involving," and variations thereof herein, is meant to encompass the items listed thereafter and equivalents thereof as well as additional items.

What is claimed is:

1. A system, comprising:
  at least one data processing apparatus operatively coupled to one or more non-transitory processor readable media, wherein the non-transitory processor readable media have instructions for configuring the at least one data processing apparatus to perform the following steps:
    provide membership services, to each of a plurality of users that are respectively associated with each of a plurality of user computing devices;
    for each of the plurality of user computing devices:
      determine, in response to information received regarding the respective user associated with the respective user computing device, an amount of carbon embodied in a good in relation to production of the good or a service produced by the respective user associated with the respective user computing device; and generate a respective mandate for an amount of carbon to be sequestered over a period of time by the respective user associated with the respective user computing device;

provide, to each of the plurality of user computing devices, software having instructions that, when executed, configure the plurality of user computing devices to operate within the membership services;

receive, from a configured user computing device of a first respective user of the plurality of users, an encrypted data payload including information representing at least one of carbon removal and/or carbon sequestering embodied in a good in relation to production of the good or a service produced by the first user;

validate, the information received in the encrypted data payload;

determine, as a function of machine learning and artificial intelligence, at least one of carbon removal and/or carbon sequestering associated with validated information in the encrypted data payload;

access a first respective mandate generated for the amount of carbon to be sequestered over a period of time by the first user;

determine, as a function of the validated information and the first respective mandate, whether the first user is compliant with the first respective mandate;

where the first user is compliant with the first respective mandate;
automatically maintain the at least one operating feature of the configured computing device associated with the first user.

2. The system of claim 1, wherein the encrypted data payload includes information representing the first user's production and/or consumption of green goods, wherein the green goods include goods whose production decreases legacy carbon, and further wherein determining whether the first user is compliant with the first respective mandate is further in accordance with the information representing the first user's production and/or consumption of the green goods.

3. The system of claim 2, wherein the encrypted data payload includes information representing the first user's production and/or consumption of non-green goods, wherein the non-green goods include goods whose production does not decrease legacy carbon, and further wherein determining whether the first user is compliant with the first respective mandate is further in accordance with the information representing the first user's production and/or consumption of the non-green goods.

4. The system of claim 3, wherein the non-transitory processor readable media have instructions for configuring the at least one data processing apparatus to determine whether the first user is compliant with the first respective mandate by determining a net carbon effect.

5. The system of claim 1, wherein the encrypted data payload includes information representing at least one of: desalination; bottling; $CO_2$ fuels; microalgae; concrete building materials; soil carbon sequestration; biochcar; and enhanced oil recovery.

6. The system of claim 1, wherein the at least one data processing apparatus includes an artificial neural network, wherein the at least one artificial neural network includes at least one of a convolutional neural network, a recurrent neural network, and an auto encoder neural network.

7. The system of claim 6, wherein the at least one artificial neural network operates to assign respective weights to at least some of the information in the encoded data payload, wherein the weights impact the determination of whether the first user is in compliance with the respective first mandate.

8. The system of claim 1, wherein the non-transitory processor readable media have instructions for configuring the at least one data processing apparatus to validate at least some of the information received in the encrypted data payload by:
identifying the source of a key required to decrypt the at least some of the information in the encrypted data payload;
receive, from the source, the key;
decrypt the at least some of the information using the key; and
validate the decrypted at least some of the information.

9. A method, comprising:
providing, by at least one data processing apparatus operatively coupled to one or more non-transitory processor readable media that configure the at least one data processing apparatus, membership services, to each of a plurality of users that are respectively associated with each of a plurality of user computing devices;

for each of the plurality of user computing devices:
determining, by the at least one data processing apparatus in response to information received regarding the respective user associated with the respective user computing device, an amount of carbon embodied in a good in relation to production of the good or a service produced by the respective user associated with the respective user computing device; and
generating, by the at least one data processing apparatus, a respective mandate for an amount of carbon to be sequestered over a period of time by the respective user associated with the respective user computing device;

providing, by the at least one data processing apparatus to each of the plurality of user computing devices, software having instructions that, when executed, configure the plurality of user computing devices to operate within the membership services;

receiving, by the at least one data processing apparatus from a configured user computing device of a first user of the plurality of users, an encrypted data payload including information representing at least one of carbon removal and/or carbon sequestering embodied in a good in relation to production of the good or a service produced by the first user;

validating, by the at least one data processing apparatus, the information received in the encrypted data payload;

determining, by the at least one data processing apparatus as a function of machine learning and artificial intelligence, at least one of carbon removal and/or carbon sequestering associated with validated information in the encrypted data payload;

accessing, by the at least one data processing apparatus, a first respective mandate generated for the amount of carbon to be sequestered over a period of time by the first user;

determining, by the at least one data processing apparatus as a function of the validated information and the first respective mandate, whether the first user is compliant with the first respective mandate;

where the first user is compliant with the first respective mandate;

automatically maintaining, by the at least one data processing apparatus, the at least one operating feature of the configured computing device associated with the first user.

10. The method of claim 9, wherein the encrypted data payload includes information representing the first user's production and/or consumption of green goods, wherein the green goods include goods whose production decreases legacy carbon, and further wherein determining whether the first user is compliant with the first respective mandate is further in accordance with the information representing the first user's production and/or consumption of the green goods.

11. The method of claim 10, wherein the encrypted data payload includes information representing the first user's production and/or consumption of non-green goods, wherein the non-green goods include goods whose production does not decrease legacy carbon, and further wherein determining whether the first user is compliant with the first respective mandate is further in accordance with the information representing the first user's production and/or consumption of the non-green goods.

12. The method of claim 11, further comprising:

determining, by the at least one data processing apparatus, whether the first user is compliant with the first respective mandate by determining a net carbon effect.

13. The method of claim 9, wherein the encrypted data payload includes information representing at least one of: desalination; bottling; $CO_2$ fuels; microalgae; concrete building materials; soil carbon sequestration; biochcar; and enhanced oil recovery.

14. The method of claim 9, wherein the at least one data processing apparatus includes an artificial neural network, wherein the at least one artificial neural network includes at least one of a convolutional neural network, a recurrent neural network, and an auto encoder neural network.

15. The method of claim 14, wherein the at least one artificial neural network operates to assign respective weights to at least some of the information in the encoded data payload, wherein the weights impact the determination of whether the first user is in compliance with the first respective mandate.

16. The method of claim 9, wherein validating at least some of the information received in the encrypted data payload includes:

identifying, by the at least one data processing apparatus, the source of a key required to decrypt the at least some of the information in the encrypted data payload;

receiving by the at least one data processing apparatus from the source, the key;

decrypting, by the at least one data processing apparatus, the at least some of the information using the key; and validating, by the at least one data processing apparatus, the decrypted at least some of the information.

17. The system of claim 1, where the first user is not compliant with the first respective mandate, the at least one data processing apparatus is further configured to:

identify a threshold associated with the carbon removal and/or carbon sequestering;

determine that the threshold is met; and alter the first respective mandate.

18. The method of claim 9, where the first user is not compliant with the first respective mandate:

identifying, by the at least one data processing apparatus, a threshold associated with the carbon removal and/or carbon sequestering;

determining, by the at least one data processing apparatus, that the threshold is met; and altering, by the at least one data processing apparatus, the first respective mandate.

19. The system of claim 1, wherein the at least one data apparatus is further configured to:

generate a respective mandate for an amount of carbon to be sequestered over a period of time by one respective user; and generate a different respective mandate for an amount of carbon to be sequestered over a period of time by a second respective user.

20. The method of claim 9, further comprising:

generating, by the at least one data processing apparatus, a respective mandate for an amount of carbon to be sequestered over a period of time by one respective user; and generating, by the at least one data processing apparatus, a different respective mandate for an amount of carbon to be sequestered over a period of time by a second respective user.

* * * * *